United States Patent [19]

Chen et al.

[11] Patent Number: 4,670,272

[45] Date of Patent: Jun. 2, 1987

[54] THERMOSTABLE CREME

[75] Inventors: Jiann-Yuh Chen, Irving; Dennis W. Koerner, Bedford, both of Tex.

[73] Assignee: Frito-Lay, Inc., Dallas, Tex.

[21] Appl. No.: 796,213

[22] Filed: Nov. 8, 1985

[51] Int. Cl.$^4$ .......................... A23G 3/00; A23L 1/04
[52] U.S. Cl. ........................ 426/94; 426/572; 426/573; 426/578; 426/659; 426/330; 426/613; 426/439; 426/568
[58] Field of Search ............... 426/330.1, 572, 564, 426/659, 568, 94, 439, 613, 661, 573, 578, 330

[56] References Cited

U.S. PATENT DOCUMENTS

| | | | |
|---|---|---|---|
| 2,171,244 | 8/1939 | Otterbacher | 99/134 |
| 2,359,228 | 9/1944 | Lloyd et al. | 426/572 |
| 2,682,472 | 6/1954 | Wagner | 426/659 |
| 2,992,188 | 7/1961 | Miller et al. | 252/363.5 |
| 2,992,925 | 7/1961 | Green et al. | 99/131 |
| 3,198,637 | 8/1965 | Harris et al. | 426/659 |
| 3,479,190 | 11/1969 | Ganz | 99/139 |
| 3,586,513 | 6/1971 | Horn et al. | 99/134 |
| 3,687,690 | 8/1972 | Moore | 426/659 |
| 4,120,987 | 10/1978 | Moore | 426/572 |
| 4,146,652 | 3/1979 | Kahn | 426/572 |
| 4,232,049 | 11/1980 | Blake | 426/572 |
| 4,312,891 | 1/1982 | Eisfeldt | 426/573 |
| 4,388,337 | 6/1983 | Cawdron | 426/573 |

*Primary Examiner*—Jeanette Hunter
*Attorney, Agent, or Firm*—Bernard, Rothwell & Brown

[57] ABSTRACT

Thermostable cremes having exceptionally low water activities can be produced by dispersing a hydrocolloid in corn syrup; dispersing a modified starch and albumin in the colloidal dispersion; aerating the dispersion; and cooking the dipersion. These cremes exhibit excellent texture while offering the advantages of an extended shelf life.

36 Claims, No Drawings

THERMOSTABLE CREME

BACKGROUND OF THE INVENTION

The present invention relates to thermostable cremes having low levels of water activity. Water activity has become a major concern to those in the food industry since foodstuffs with low water activities generally have longer shelf-lives than foodstuffs with relatively higher levels of water activity. In addition, many high moisture products with high water activities are microbiologically unstable.

The water activity of a food is defined as the partial vapor pressure of water in the food divided by the saturation vapor pressure of pure water at the temperature of the food. Water activity can be considered to be a measure of the tendency of a material to allow moisture to migrate out of the material to its surrounding environment. Water activity can be determined by placing a sample in a container, which is then sealed, and after equilibrium is reached, determining the relative humidity above the sample.

Cremes known in the prior art generally have high moisture levels and high levels of water activity ($A_w$ of 0.8–0.9). One problem with such cremes is that when they are combined with another food product having a lower level of moisture, such as a pastry, the disparity in moisture promotes the transmission of water from the creme into the food product of lower moisture. When the other foodstuff is a pastry, this transmission of moisture can cause the pastry to become soggy.

While high moisture cremes having a low water activity have been produced by adding various humectants, cremes produced in this manner have not been thermostable. The importance of producing a high moisture creme having a low water activity and thermal stability is especially important in the production of creme-filled pastries where the filling is added to dough prior to baking, as opposed to adding the filling after baking. Accordingly, there is a need for a high moisture creme which is thermostable and exhibits low levels of water activity.

SUMMARY OF THE INVENTION

The present invention relates to a thermostable creme comprising an aerated mixture of a hydrocolloid, a modified starch, an albumin and corn syrup. The creme can additionally contain such additives as water, polydextrose, fat, protein other than albumin, emulsifiers, flavoring agents and salt. These cremes exhibit relatively low levels of water activity ($A_w$ of 0.6–0.7), even at high water content, and are thermostable under normal baking conditions. The ability to retain relatively low water activity at high moisture levels allows the texture to be controlled independently of water activity.

DETAILED DESCRIPTION OF THE PREFERRED EMBODIMENT

This invention relates to an edible material which exhibits a creamy texture, thermostability, and shelf stability. The material comprises an aerated mixture in which structure forming and temperature stabilizing polymers including modified starch, protein and gums are dispersed, aerated and stabilized in a low moisture syrup system.

The cremes of the invention can be used in a number of products including fried pie cookies, creme puffs, dual-textured pastries, etc. These cremes can be combined with various pastry doughs and, upon baking, result in creme-filled pastries having excellent dual-textures. Due to the low water activity of the creme, the pastry resists loss of its dual texture from the migration of moisture into the pastry dough portion.

The thermostable cremes of the present invention generally contain high levels of corn syrup. In producing the cremes, a hydrocolloid, a modified starch and an albumin are dispersed and hydrated in the corn syrup. Optionally, modifying amounts of water, polydextrose, fat, protein (other than albumin), emulsifiers, flavorings and salt can be added.

Corn syrups are concentrated water solutions of partial hydrolysates of starch. Corn syrups can be classified on the basis of D.E. values. The term D.E. is used herein to refer to the reducing sugars content of the dissolved solids in starch hydrolysates expressed as precent dextrose, as measured by the Luff-Schoorl method (NBS Circular C-40, page 195 as appearing in "Polarimetry Saccharimetry, and the Sugars" by Fredrick J. Bates and Associates). Generally speaking, the corn syrup for use in the present invention has a D.E. value of from about 24 to about 70. Preferably, the D.E. value is from 42 to about 62. Since corn syrups contain dextrose, maltose, and higher oligosaccharides derived from starch by acid or enzyme hydrolysis or by the combination of the two, another basis for characterization of the corn syrup is with respect to the content of individual saccharides. For example, one particularly preferred corn syrup for use in the present invention is a high fructose corn syrup. The use of corn syrup—especially when the corn syrup is a mixture of syrups, one of which is high fructose corn syrup—allows the production of cremes having low levels of water activity. The amount of corn syrup needed to form the cremes is at least an amount sufficient to disperse the remaining ingredients therein. Generally the corn syrup is from about 50 to about 90 percent by weight of an unflavored creme. Preferably, the corn syrup is from about 55 to 81 percent by weight of an unflavored creme. With increasing amounts of corn syrup, the water activity of the creme decreases, the bulk density of the creme decreases and the creme tends to thin out. With lower levels of corn syrup, the creme is more viscous and has higher levels of water activity.

In addition to the corn syrup, the creme contains a hydrocolloid. Hydrocolloids serve to establish the structure of the creme due to their high water binding capacity and the gel-forming properties at high temperatures. The hydrocolloids which can be used to prepare the cremes of the present invention can be natural or synthetic gums and include such colloids as carrageenan, guar gum, alginate, xanthan gum and the like or methylcellulose, carboxymethylcellulose, ethylcellulose, hydroxypropyl methylcellulose, micro-crystalline cellulose and the like. Two particularly preferred hydrocolloids are micro-crystalline cellulose products of FMC Corporation known under the tradenames Avicel TM RC-591 and Avicel# RC-611. RC-591 is a white, water dispersible powder with a particle size such that less than 0.1 percent is retained on a 60-mesh screen, and is known to be made up of 89 parts micro-crystalline cellulose and 11 parts sodium carboxymethylcellulose. RC-611 is made up of 85 parts microcrystalline and 15 parts of sodium carboxymethylcellulose. Micro-crystalline cellulose is listed in the Fourth Supplement to the Food Chemicals Codex, First Edition by the National Academy of Sciences-National Research Council as: Cellulose, Microcrystalline (cellulose gel). The amount of hydrocolloid that is dispersed in the corn syrup can vary widely; however, amounts of from about 0.5 to 4 percent by weight of an unflavored creme have been found to be suitable. Preferably, from about 2 to 3 percent by weight is used.

The modified starches can be pre-gelatinized or non-gelatinized. Preferred modified starches for use in the invention are modified, non-gelatinized starches which are cold water hydratable. Modified starches of this type are known and commercially available. One such starch is commercially available under the tradename MIRA-GEL TM (A. E. Staley Manufacturing Co.). Modified starches of this type hydrate in water at ambient temperature, first forming a thick, smooth consistency and then setting to a resilient, colloidal gel structure. Pre-gelatinized starches, by comparison, also thicken in water without heat. If one chooses to employ a non-gelatinized modified starch which is not cold water hydratable, it is preferred that the starch have a Brabender viscosity (CML-B-191) from about 100 to about 500 Brabender units, preferably from about 150 to about 400 Brabender units at 95° C. A suitable modified, non-gelatinized starch is commercially available under the tradename NATIONAL FRIGEX TM (National Starch and Chemical Corp.).

While the amount of modified starch that is used in the present invention can vary, amounts from about 2 to 6 percent by weight of the unflavored creme have been found to be sufficient. Preferably from about 3 to about 4 weight percent is used.

Protein in the form of albumin (preferably egg albumin), is also present in the creme composition of the invention in an amount from about 0.1 to about 5 percent by weight of the unflavored creme, preferably from about 2 to about 4 percent by weight of the unflavored creme. Proteins other than albumin can also be present, provided the total amount of protein does not exceed about 5 weight percent. Other proteinaceous materials which can be present include, for example, non-fat milk solids, water-soluble soy protein derivatives, gelatin and sodium or calcium caseinate.

Fat may be used to further modify the texture of the creme and serve as a flavor carrier. The fat can be high in unsaturation or can be a saturated fat. Unsaturated fats give a softer texture to the creme while the use of saturated fats provides a harder texture. Examples of such unsaturated fats include safflower oil, sunflower oil, cottonseed oil, soybean oil and corn oil. The saturated fats that can be used include the hydrogenated oil products of coconut, olive, corn, cottonseed, peanut, etc. While the melting points of the fats will generally vary according to the degree of saturation, fats having a Wiley melting point of 90°–110° F. are preferred. One particularly preferred fat is a 92° F. Wiley melting point partially-hydrogenated coconut oil sold under the trademark Hydrol 92 TM by SCM Corporation. Generally, the fats are added in amounts of from about 0 to about 20 percent by weight of an unflavored creme.

Emulsifiers may be added to the cremes to induce the formation of a stable emulsion. Among the more suitable emulsifiers are hydroxylated lecithin and mono, di- or polyglycerides of fatty acids, such as monostearin and monopalmitin.

Many blends of emulsifiers are commercially used and readily available. For example, it may be desirable to provide a controlled hydrophilic-lypophilic balance (HLB) as with a lypophilic emulsifier such as glyceryl monostearate or sorbitan monostearate with a hydrophilic material such as Polysorbate 60. When a blend of emulsifiers is used, the HLB value should be from about 8 to about 13 because this range is more hydrophilic and forms oil in water emulsions. HLB values from 1 to 8 should be avoided since this range is more lypophilic and may provide undersirable properties to the product. A particularly preferred emulsifier is octaglycerol mono-stearate marketed by SCM Corporation under the trademark Santone 8-1-S TM. Emusifiers are generally added in conventional amounts, for example about 0.01 to about 2 percent by weight of an unflavored creme and preferably from about 0.1 to about 0.2 percent.

While water is not required, aside from being inherently present in various ingredients, it may be desirable to increase the moisture level of the creme which is generally from about 10 to about 22 percent. Preferably, the moisture level is about 15 percent. While the amount can vary, preferably the water can be added in amounts of from 0 to about 10 weight percent of the unflavored creme.

Various food grade acidulents may be added to the creme according to one's taste preferences. Examples of such acidulents include fumaric, phosphoric, tartaric, malic and citric acid. Preferably, citric acid is used.

Flavoring agents can be added to the cremes to impart various flavors to the creme. While the amount of such flavoring agents will vary, generally such agents are added in amounts of from about 0 to about 10 weight percent of the flavored creme. Suitable flavoring agents can be employed to impart vanilla, creme, chocolate, cheese, butter, coffee, fruit, mint, vegetable or other flavors.

Aside from the above ingredients, other additives may be dispersed in the corn syrup. Such additives are generally present in conventional amounts to impart their characteristic effects to the creme. Typical of such additives are salt (0 to about 2.5 weight percent) and polydextrose (0 to about 10 weight percent). Other ingredients which can be employed in conventional amounts include food colors, polyols, vitamins and minerals.

The manner in which the various ingredients are combined is critical to the obtainment of the desired properties in the creme. Initially, the hydrocolloid is dispersed thoroughly in the corn syrup, which is preferably of the high-fructose variety for a sweet creme. A corn syrup with a D.E. of about 42 is preferred for use in the preparation of a savory creme. Any convenient mixing device can be employed to disperse the hydrocolloid in the corn syrup, provided that a thorough dispersion is obtained.

After the hydrocolloid has been thoroughly dispersed, the modified starch, albumin and other proteins, if present, are added to the dispersion, again with thorough mixing. The dispersion is aerated to impart the desired texture. Aeration can be achieved by using a high speed mixer to disperse the hydrocolloid, modified starch and albumin.

After the ingredients have been combined, the dispersion is cooked. The cooking time and temperature required to develop the desired texture in the creme will depend largely upon the type of modified starch used in the formulation. When a cold water hydratable starch such as MIRA-GEL TM 463 or a pre-gelatinized starch is employed, the desired texture can be developed using a relatively short cooking cycle, e.g. about 10 minutes, at a temperature of about 60°–80° C. When an ungelatinized starch that is not cold water hydratable is employed, a longer cooking cycle, e.g. about 1 hour at 70° C. to 80° C., is required to develop the desired texture.

After cooking, the fat and emulsifier, if present, are added as desired to modify the texture. Flavor additives may also be added to the dispersion at this point using the fat as a carrier. Flavor additives that are heat stable, such as a salt, can be added prior to the cooking cycle.

The cremes of the present invention can be used to produce a variety of foodstuffs. Particularly preferred foodstuffs are creme-filled bakery products such as puff pastries, creme puffs, fried pie cookies, and various other dual-textured pastries. If desired, particulate food materials may be incorporated into the cremes of the invention. As merely exemplary of such materials, one can mention chocolate chips, butterscotch chips, dried fruit bits, nuts and the like.

The following examples further illustrate various features of the present invention but are intended in any way to limit the scope of the present invention.

In the following examples, all parts and percents are by weight unless specified otherwise. In the examples, "HFCS" indicates high fructose corn syrup and "CS" indicates corn syrup.

EXAMPLE 1

A thermostable creme was prepared from the following ingredients.

| Ingredient | % |
| --- | --- |
| HFCS (42) | 63.5 |
| CS (62 D.E.) | 17.7 |
| Egg White | 5.0 |
| Miragel 463 | 5.0 |
| Polydextrose | 3.0 |
| Fat | 3.0 |
| Avicel RC-591 | 2.0 |
| Salt | 0.6 |
| Citric Acid | 0.1 |
| Emulsifier | 0.1 |
| | 100.0 |

To a suitable vessel equipped with a mechanical mixer and containing 63.5 parts of high fructose corn syrup (42% conversion) was added 2 parts of Avicel TM RC-591. The ingredients were mixed vigorously for approximately 10 minutes. As the dispersion was continuously mixed, 5 parts of egg white, 5 parts of MIRAGEL TM 463, 0.1 parts of citric acid, and 0.6 parts of salt were added. Next, 17.7 parts of corn syrup (62 D.E.) and 3 parts polydextrose were added. The dispersion was allowed to mix for an additional 5 minutes. With continued mixing, the vessel containing the dispersion was immersed in a steam bath for approximately 10 minutes. Thereafter, the mixing was continued and 3 parts of fat (Hydrol 92 TM) along with 0.1 parts of an emulsifier (Santone 8-1-S TM) were added to the cooked dispersion. After about 3 minutes the mixing was stopped to yield a creme having a water activity of approximately 0.68.

EXAMPLE 2

A thermostable creme was prepared from the following ingredients:

| Ingredient | % |
| --- | --- |
| CS (42 D.E.) | 57.2 |
| Fat | 15.0 |
| Water | 10.0 |
| Polydextrose | 5.0 |
| Egg White | 4.0 |
| Miragel 463 | 4.0 |
| Salt | 2.5 |
| Avicel RC-591 | 2.0 |
| Emulsifier | 0.2 |
| Citric Acid | 0.1 |
| | 100.0 |

To the same type of vessel as used in Example 1 and containing 10 parts water and 40.04 parts corn syrup (42 D.E.) was added 2 parts of Avicel TM RC-591. The ingredients were mixed vigorously for approximately 10 minutes. Next, 4 parts egg white solids, 4 parts MIRAGEL TM 463, 2.5 parts salt and 0.10 parts citric acid were added to the dispersion. Thereafter, 5 parts polydextrose and 17.16 parts of corn syrup (42 D.E.) were added to the dispersion which was then mixed for 5 minutes. The vessel was immersed in a steam bath for approximately 5 minutes. 15 parts of fat (95° F.) and 0.20 parts of an emulsifier (Santone 8-1-S TM) were added and the contents of the vessel were mixed for 3 minutes to yield a creme base. Cheese powder was then mixed in the creme base in a 1:9 ratio of powder to creme. The cheese flavored creme had a water activity of 0.70.

What is claimed is:

1. A thermostable edible creme having a water activity of about 0.7 or less which is produced by the process which comprises dispersing a hydrocolloid in corn syrup thereby forming a colloidal dispersion; dispersing in the colloidal dispersion albumin and a modified starch selected from the group consisting of pre-gelatinized starches, non-gelatinized cold water hydratable starches and non-gelatinized starches having a Brabender viscosity from about 100 to about 500 Brabender units, wherein the dispersion comprises from about 50 to about 90 percent by weight of corn syrup, from about 0.5 to about 4 percent by weight of hydrocolloid, from about 2 to about 6 percent by weight of modified starch, and from about 0.1 to about 5 percent by weight of albumin; aerating the dispersion; and cooking the dispersion for about five minutes to one hour at a temperature of from about 60° C. to 80° C.

2. A thermostable edible creme as claimed in claim 1 wherein the corn syrup has a dextrose equivalence of from about 24 to about 70.

3. A thermostable edible creme as claimed in claim 1 wherein the corn syrup is high fructose corn syrup.

4. A thermostable edible creme as claimed in claim 1, wherein the corn syrup has a dextrose equivalent of about 42.

5. A thermostable edible creme as claimed in claim 1, wherein the creme has a water activity of from 0.6 to 0.7.

6. A thermostable edible creme as claimed in claim 1, wherein the process additionally comprises adding a fat and an emulsifier to the dispersion after cooking.

7. A thermostable edible creme as claimed in claim 6 containing:

(a) from about 50 to about 90 percent by weight of corn syrup;

(b) from about 2 to about 6 percent by weight of a modified starch;

(c) from about 0.1 to about 5 percent by weight of albumin;

(d) from about 0.5 to about 4 percent by weight of a hydrocolloid;

(e) from about 0.01 to about 2 percent by weight of an emulsifier;

(f) from about 0 to about 20 percent by weight of a fat; and (g) from about 10 to about 22 percent by weight of water.

8. A thermostable edible creme as claimed in claim 1 wherein the hydrocolloid is selected from the group consisting of carrageenan, guar gum, alginate, xanthan gum, methylcellulose, carboxymethylcellulose, ethylcellulose, hydroxypropyl methylcellulose micro-crystalline cellulose and mixtures thereof.

9. A thermostable edible creme as claimed in claim 1, wherein the hydrocolloid is a mixture of micro-crystalline cellulose and sodium carboxymethylcellulose.

10. A thermostable edible creme as claimed in claim 1, wherein the modified starch is a non-gelatinized starch having a viscosity of from about 100 to about 500 Brabender units at 95° C.

11. A thermostable edible creme as claimed in claim 1, wherein the modified starch is a non-gelatinized starch having a viscosity of from about 150 to about 400 Brabender units at 95° C.

12. A thermostable edible creme as claimed in claim 1, wherein the modified starch is a non-gelatinized starch which is cold water hydratable.

13. A thermostable edible creme as claimed in claim 1, wherein the modified starch is a pre-gelatinized starch.

14. A thermostable creme as claimed in claim 7, additionally containing a proteinaceous material selected from the group consisting of non-fat milk solids, water-soluble soy protein derivatives, gelatin, sodium caseinate, and calcium caseinate.

15. A thermostable edible creme as claimed in claim 1, wherein the albumin is egg albumin.

16. A thermostable edible creme as claimed in claim 6, wherein the fat is an unsaturated fat selected from the group consisting of safflower oil, sunflower oil, cottonseed oil, soybean oil and corn oil.

17. A thermostable edible creme as claimed in claim 6, wherein the fat is a saturated fat selected from the group consisting of hydrogenated oil products of coconut, olive, corn, cottonseed, soybean and peanut.

18. A shelf-stable comestible product comprising a cooked dough containing, as a filling material, a thermostable, edible creme as claimed in claim 1.

19. A shelf-stable comestible product as claimed in claim 18, wherein the dough is baked.

20. A shelf-stable comestible product as claimed in claim 18, wherein the dough is fried.

21. A shelf-stable comestible product as claimed in claim 18, in the form of a creme puff.

22. A shelf-stable comestible product as claimed in claim 18, in the form of a fried-pie cookie.

23. A shelf-stable comestible product as claimed in claim 18, in the form of a layered pastry comprising alternating layers of baked pastry dough and creme.

24. A thermostable edible creme as claimed in claim 7, additionally containing from 0 to 10 weight percent of a flavoring agent.

25. A cooked aerated thermostable edible creme comprising a colloidal dispersion containing from about 50 to about 90 percent by weight of corn syrup, from about 2 to about 6 percent by weight of a modified starch selected from the group consisting f pre-gelatinized and non-gelatinized starches, from about 0.5 to about 4 percent by weight of a hydrocolloid, and from about 0.1 to about 5 percent by weight of albumin, which creme exhibits a water activity of 0.7 or less.

26. The thermostable edible creme as claimed in claim 25 wherein the hydrocolloid is selected from the group consisting of carrageenan, guar gum, alginate, xanthan gum, methylcellulose, carboxymethylcellulose, ethylcellulose, hydroxypropyl methylcellulose, microcrystalline cellulose and mixtures thereof.

27. The thermostable edible creme as claimed in claim 25 wherein the modified starch is a non-gelatinized starch having a viscosity of from about 100 to about 500 Brabender units at 95° C.

28. The thermostable edible creme as claimed in claim 25 wherein said colloidal dispersion additionally contains from about 0.01 to about 2 percent by weight of an emulsifier.

29. The thermostable edible creme as claimed in claim 28 wherein said emulsifier has a hydrophilic-lypophilic balance of from about 8 to about 13.

30. The thermostable edible creme as claimed in claim 25 wherein said colloidal dispersion additionally contains up to about 20 percent by weight of a fat.

31. The thermostable edible creme as claimed in claim 20 wherein said fat is an unsaturated fat selected from the group consisting of safflower oil, sunflower oil, cottonseed oil, soybean oil and corn oil.

32. The thermostable edible creme as claimed in claim 30 wherein said fat is a saturated fat selected from the group consisting of hydrogenated oil products of coconut, olive, corn, cottonseed, soybean and peanut.

33. The thermostable edible creme as claimed in claim 25 wherein said colloidal dispersion additionally contains from about 10 to about 22 percent by weight of water.

34. The thermostable edible creme as claimed in claim 25 additionally containing a proteinaceous material selected from the group consisting of non-fat milk solids, water-soluble soy protein derivatives, gelatin, sodium caseinate and calcium caeinate.

35. A shelf-stable comestible product comprising a cooked dough containing, as a filling material, a cooked aerated thermostable edible creme comprising a colloidal dispersion containing from about 50 to about 90 percent by weight of corn syrup, from about 2 to about 6 percent by weight of a modified starch selected from the group consisting of pre-gelatinized and non-gelatinized starches, from about 0.5 to about 4 percent by weight of a hydrocolloid, and from about 0.1 to about 5 percent by weight of albumin, which creme exhibits a water activity of 0.7 or less.

36. The shelf-stable comestible product as claimed in claim 35, wherein said product comprises a layered pastry having alternating layers of baked pastry dough and thermostable creme.

* * * * *